United States Patent Office 3,337,483
Patented Aug. 22, 1967

3,337,483
TRAFFIC MARKING COMPOSITIONS CONTAINING THERMOPLASTIC ROSINLESS RESINOUS BINDER
Charles Edwin Searight, Ezra McLaurin Alexander, and John Robert Ryan, Jackson, Miss., assignors to Cataphote Corporation, Jackson, Miss., a corporation of Ohio
No Drawing. Filed Oct. 23, 1963, Ser. No. 318,175
13 Claims. (Cl. 260—17)

This invention relates to traffic marking compositions and traffic markers made therefrom.

Traffic markers of the preformed tile-type have been in use for years. These generally contain a considerable amount of rosin or rosin-based materials. Rosin and rosin-based materials are not stable to ultraviolet light, as from sunlight, and as a result traffic markers made from such materials discolor. As little as 5% rosin in a white traffic marker is sufficient to turn the white marker into a yellow marker within just a few weeks of exposure to ordinary sunlight.

There is provided by the present invention novel traffic marker compositions which are stable to ultraviolet light and which employ relatively inexpensive materials. These compositions are characterized by the absence of rosin, rosin derivatives and other resinous materials which afteryellow, such as phenolic-based resins, chlorinated biphenyl, unmodified polystyrene and coumarone-indene resins.

These novel traffic marker compositions comprise in solid intimate unitary admixture form: (1) a binder, (2) a coloring agent, (3) glass beads (optional) and (4) fillers and extenders (optional), with said binder comprising (a) about 5 to 80% by weight of an alkyl cellulose, (b) about 5 to 90% by weight of a thermoplastic rosinless resin which is hard at climatic temperatures, (C) from 0 up to a small percent by weight of a wax-like material and (d) from 0 to 20% by weight of a plasticizer compatible with the alkyl cellulose and the resin.

The binder components of the composition comprise the alkyl cellulose, thermoplastic resin, and wax and plasticizer when used.

The binder advisably comprises from 20 to 95 percent by weight of the entire composition. Furthermore, although referred to as the binder it constitutes the body of the traffic marker when no fillers, extenders and/or glass beads are included therein.

The traffic marker composition of this invention without fillers and glass beads comprises a solid intimate unitary homogenous admixture of (1) a binder comprising (a) about 5 to 80% by weight of a lower alkyl cellulose, (b) about 5 to 90% by weight of a thermoplastic rosinless light-stable resin which is hard at climatic temperatures, (c) from 0 to 4% by weight of a wax-like material, (d) from 0 to 20% by weight of a plasticizer compatible with the ethyl cellulose and the resin and (2) a coloring agent.

Representative of alkyl cellulose materials which can be used are the lower alkyl celluloses including ethyl cellulose, propyl cellulose and butyl cellulose. Most suitably the binder contains about 15 to 50% by weight of an alkyl cellulose. The most useful material for inclusion in these compositions is ethyl cellulose, particularly such material having an ethoxyl content of 47.5 to 49% and a viscosity of from 10 to 200 centipoises. Ethyl cellulose is practically colorless and retains the condition under a wide range of uses. Neither sunlight nor ultraviolet light affects the color. Ethyl cellulose has a very high tensile strength and excellent flexibility over a wide temperature range which results in unusual toughness. Toughness at high and low temperatures is necessary in traffic markers. In addition, ethyl cellulose is compatible with a wide range of resins and plasticizers. Therefore many resins can be used successfully with it in this invention.

Although a wide variety of nonyellowing hard resins can be used in conjunction with the alkyl cellulose, and some such resins will be described hereinafter, the hard resins considered most suitable are those formed by copolymerizing styrene, alpha-methyl styrene and at least one ester of an unsaturated acid with the combined amounts of styrene and alpha-methyl styrene being at least 50% by weight of the copolymer and with the alpha-methyl styrene being about 5% to 40% of the combined weight of styrene and alpha-methyl styrene.

Although at least 5% of alpha-methyl styrene is used, based on the combined weight of styrene and alpha-methyl styrene, it is considered advisable to use at least 20% of alpha-methyl styrene on the same basis.

Although styrene and alpha-methyl styrene can be employed as monomers, it is also feasible to employ short chain polymers of these two materials, such as with molecular weights up to about 12,000.

The esters which can be used are those of unsaturated mono or dibasic carboxylic acids as well as mixtures of esters of mono basic carboxylic acids, dibasic carboxylic acids, and mono basic acids mixed with dibasic acids. The esters are advisably mono unsaturated with the unsaturation being ethylenic viz., a single double bond.

More particularly, the esters useful in this invention can be defined as the esters such as can be formed by reacting lower alkanols or lower polyols with lower mono ethylenically unsaturated mono- or di-basic carboxylic acids, or which are formed by processes which give the same esters under consideration. Thus, esters of methanol, ethanol, propanol, butanol, isobutanol, pentanol, hexanol, octanol, glycerol, lower alkylene glycols such as ethylene glycol and propylene glycol, and sugar alcohols such as mannitol, sorbitol and pentaerythritol with acids such as acrylic acid, methacrylic acid, crotonic acid, isocrotonic acid, maleic acid, fumaric acid, citraconic acid, itaconic acid, mesaconic acid, oleic acid, elaidic acid, linoleic acid and linolenic acid. The esters having up to 14 carbons are usually preferred with those having 10 carbons or less being specially suitable for making the resinous polymers. Furthermore, the esters can be mono or diesters of the dibasic acids.

Some of the specific esters which can be used are butyl acrylate, dibutyl fumarate, dioctyl fumarate, dioctyl maleate, monobutyl monocarboxyl fumarate, propyl crotonate, butyl isocrotonate, dibutyl citraconate, butyl oleate, ethyl linoleate and ethylene glycol diacrylate.

Part of the ester of an unsaturated acid can be replaced with various amounts of alkanoic (particularly lower carboxylic acids), alkenoic (particularly lower alkenoic acids), phenyl carboxylic, aralkanoic (particularly phenyl-lower carboxylic acids) and aralkenoic acids (particularly phenyl-lower alkenoic acids) such as acetic acid, butyric acid, acrylic acid, methacrylic acid, maleic acid, fumaric acid, phthalic acid, isophthalic acid, terephathalic acid, lauric acid, stearic acid, benzoic acid, cinnamic acid and phenylacetic acid. The acids can be monobasic or polybasic carboxylic acids. Such acids may replace up to about 20% of an ester of an unsaturated acid.

In order to produce the copolymers the reactants are charged to a suitable reaction vessel and brought to a temperature and pressure which effects polymerization. A temperature of at least 250° F. to 300° F. is usually required to initiate the reaction. The reaction is exothermic and once it begins the heat source can be reduced or shut off until the exothermic reaction has ceased. The reaction is maintained at about 300° F. with constant agitation for about a few hours after which the temperature is gradually increased at a rate consistent with the reflux to about 350° F. over a period of a few hours. Then the reaction temperature is increased to 400–500° F. and unreacted monomer can be steam sparged off. The resinous polymer is then withdrawn from the vessel.

The resulting copolymers are thermoplastic, light colored and very fluid at the usual extrusion or hot-melt application temperatures of 350 to 450° F. The resinous polymers have good resistance to brittleness, excellent durability and are economical to manufacture. They also blend well with other ingredients used in traffic marking compositions such as pigments, fillers and glass beads. Our copending application Ser. No. 315,666 filed Oct. 11, 1963 further illustrates the preparation of these copolymer thermoplastic hard resins.

The resinous copolymers should also contain an organic phosphite or thiophosphite to stabilize them. Some of the organic phosphites and thiophosphites which can be used are trilauryl trithiophosphite, trimethylphosphite, dioctyl hydrogen phosphite, diphenyl hydrogen phosphite, trioctadecyl phosphite and phenylneopentyl phosphite. Only a small amount, and usually not over 0.5% by weight of phosphite, need be included in the polymer. Most of the polymers can be stabilized with up to about 0.1% by weight of a phosphite. The phosphite can be included in the polymer as it is formed or it can be added to the polymer after it is formed by melting the same and thoroughly dispersing it therein.

Some other hard thermoplastic resins which can be used are polyethylene, polypropylene, short and medium oil alkyds of the drying and nondrying types, polyesters, cyclized rubber and the natural resin dammar.

Hard resins are used in conjunction with ethyl cellulose to impart adhesion, additional water resistance, hardness and, in some cases, better dimensional stability. The harder resins are usually tacky but ethyl cellulose reduces the tack and imparts toughness to the resins over a wide temperature range.

In those instances where the hard resin is slightly or totally incompatible with the ethyl cellulose a plasticizer which acts as a mutual solvent for these materials is used. Some plasticizers which can be used are dihexyl phthalate, dioctyl phthalate, dioctyl sebacate, dioctyl adipate and tricresyl phosphate. The amount of the plasticizer used in the compositions is not narrowly critical but usually will not exceed 20% by weight of the binder composition.

It is sometimes desirable to include a small amount of a solid wax or wax-like material in the binder composition to eliminate tack, improve moisture resistance and impart "cold flow." "Cold flow" is the ability of the marker composition to conform to a road surfacing by redistributing itself with surface changes. The amount of wax generally need not exceed 4.0% and usually much less such as 3% or less, if any, is used. However, higher amounts of waxes such as 7 and 10 percent by weight could be used with the special hard resin made by copolymerizing styrene, alpha-methyl styrene and an ester of an unsaturated acid as described herein previously. Wax-like materials such as ortho-, meta-, and para-terphenyls, which are not true waxes, are particularly suitable when a wax or wax-like material is to be added. Carnauba wax is another particularly suitable wax to use in these compositions.

For traffic marker uses a suitable coloring agent or pigment is incorporated in the binder made up of the hard resin and alkyl cellulose, with or without a plasticizer. Usually at least 5 percent by weight of a coloring agent is included in the compositions. The type of pigment used will depend on the purpose for which the marker is to be used. White markers are readily made using titanium dioxide while yellow markers can be made with a combination of chrome yellow and chrome orange, a combination of cadmium yellow and cadmium orange, or a combination of benzidine yellow and benzidine orange.

Antioxidants and ultra-violet light absorbing agents are also advisably included in the compositions. Some antioxidants which can be used are 2,6-ditertiary-butyl-para-cresol and diamylphenol. This and other antioxidants protect the alkyl cellulose and hard resins from high temperature degradation. To protect against ultra-violet light exposure an absorber such as 2,4-dihydroxybenzophenone can be included. An acid acceptor such as epoxidized soyabean oil also aids in stabilization of the binder. Generally, the combined percentages of antioxidant, ultra-violet light absorber and acid acceptor that need be used in the compositions is below 0.5%.

Glass beads or spheres which act as lens elements in focusing incident light falling on them to a point near the back surface of the beads are utilized in the traffic marking compositions. Such glass beads are usually less than thirty mesh, i.e., their diameter is such that they will pass through a U.S. standard sieve No. 30 mesh, and preferably greater than 120 mesh. Glass beads having indices of refraction of 1.5 to 2.0 are particularly suitable.

Any amount of glass beads can be used. However, a maximum of about 50% by weight is generally advisable in the total compositions.

Fillers can also be included to reduce the amount of binder needed to make traffic markers. Sand and mica are particularly useful fillers.

Barium sulfate, magnesium silicate, calcium carbonate and lithopone can be added as extenders for titanium dioxide.

Diatomaceous earth is desirable in the traffic markers since it contributes porosity to the composition and thereby assists in releasing any vapor or moisture pressure that collects underneath the marker after it is applied.

Talc is often included in the compositions because it assists in "cleanup" of the marker through rain and abrasion.

The traffic marker compositions are produced by intimately combining the ingredients so that the binder comprises the continuous phase. By first melting the hard resin, then adding the alkyl cellulose and plasticizer, if needed, followed by the coloring agent and other ingredients such as glass beads, fillers, extenders, antioxidants and so on the composition can be formulated and then molded, extruded or calendered into a form for use. The preformed marker can be made into various shapes and sizes in thickness of about $\frac{1}{32}$" to about $\frac{1}{2}$" and in most any width and length.

All or some of the glass beads may also be applied by imbedding them in the upper surface of the preformed traffic marker while it is still warm and while running it through a two roll mill.

In order that the preformed marker can be instantly applied it is desirable to apply a pressure sensitive adhesive to one side of the marker and then to apply a release paper or film over the adhesive which can be removed when the marker is to be applied to a clean traffic bearing surface, such as a street, highway, sidewalk or a factory or store floor, by the simple application of moderate pressure.

*Example 1*

A hard thermoplastic copolymer is made of the following materials:

| | Percent by weight |
|---|---|
| Dibutyl fumarate | 5 |
| Butyl acrylate | 10 |
| Alpha-methyl styrene | 20 |
| Styrene | 40 |
| Short chain poly (alpha-methyl styrene/styrene) [1] | 20 |
| Dihexyl phthalate [2] | 5 |
| Triphenyl phosphite | 0.1 |

[1] 35/65 ratio of alpha-methyl styrene/styrene; mol. wt. average 10,000.
[2] Added only to reduce the viscosity at low temperatures for pouring the material from the reaction vessel.

The specified ingredients are charged to a suitable reaction vessel and the temperature is increased to 290°–310° F. At this point an exothermic reaction begins and carries the reaction such that the temperature can be greatly reduced or completely shut off until the exothermic reaction has ceased. The reaction is maintained at about 290–310° F. with constant agitation for about two to two and one-half hours after which the temperature is gradually increased at a rate consistent with the reflux to about 390° F. over a period of time of about two hours. Then the reaction temperature is increased to 400 to 420° F. and the unreacted monomer is steam sparged off, after which the product of the reactants is withdrawn from the reaction vessel.

The hard thermoplastic resin produced as described can be used in a traffic marker composition of the following components:

| | Percent by weight |
|---|---|
| Ethyl cellulose N–200 | 11.6 |
| Hard resin (as produced above) | 15.0 |
| Terphenyl wax | 2.5 |
| Dioctyl phthalate | 7.0 |
| Carnauba wax No. 3 | 1.0 |
| Titanium dioxide | 12.1 |
| Barium sulfate | 9.4 |
| Calcium carbonate | 2.7 |
| Diatomaceous earth | 1.8 |
| Glass beads | 36.9 |

These ingredients can be combined by first adding the hard resin to a blending vessel, such as an oil jacketed vessel, and liquefying it. The oil can be conveniently maintained at about 400–450° F. to melt the resin by heat exchange. Then the ethyl cellulose can be added together with any plasticizers needed. Following that the ingredients used in large amounts, here the glass beads, are added. The addition of such substances at ambient temperature cools the resin and it becomes very viscous. This is desirable because shearing action increases with the resin viscosity and it aids in dispersing the ingredients added in small quantities. The oil temperature is increased until the mixture is fluid and then the composition is cooled and molded, extruded or calendered into preformed traffic markers of about 1/32" to 1/2" in thickness. An adhesive and release paper are applied to the preformed traffic marker as desired.

Example 2

A white traffic marker is made of the following materials:

| | Percent by Weight | |
|---|---|---|
| | Range | Specific |
| Ethyl cellulose N–150 | 5–40 | 13 |
| Hard resin (produced as in Example 1) | 5–35 | 13 |
| Dihexyl phthalate (plasticizer) | 0–20 | 4 |
| Partially epoxidized soyabean oil (an acid acceptor) | 0–3 | 1 |
| Terphenyl wax | 0–3 | 1 |
| Coloring agent (such as titanium dioxide) | 3–15 | 12 |
| Barium sulfate | 0–20 | 10 |
| Talc | 0–6 | 4 |
| Diatomaceous earth | 0–4.5 | 2 |
| Glass beads | 20–50 | 40 |
| 2,6-ditertiary-butyl-para-cresol | .01–.1 | .05 |
| 2,4-dihydroxybenzophenone | .01–.1 | .05 |
| Sand (filler) | 0–30 | 0 |
| Mica (filler) | 0–30 | 0 |

Example 3

A yellow traffic marker is made of the following materials by admixing them as herein described:

| | Percent by weight |
|---|---|
| Ethyl cellulose N–200 | 10.9 |
| Hard resin (produced as in Example 1) | 14.2 |
| Terphenyl wax | 2.3 |
| Dioctyl phthalate | 6.6 |
| Carnauba wax No. 3 | .95 |
| Titanium dioxide | 4.6 |
| Barium sulfate | 11.9 |
| Calcium carbonate | 3.8 |
| Diatomaceous earth | 2.8 |
| Benzidine yellow | 4 |
| Benzidine orange | .05 |
| Glass beads | 38.15 |

Example 4

The following table lists additional traffic marker compositions which are admixed as herein described. The amounts are in percent by weight.

| | A | B | C | D | E |
|---|---|---|---|---|---|
| Ethyl cellulose, N-Type [1] | N–200, 12 | N–150, 15 | N–100, 13 | N–50, 18 | N–10, 10 |
| Hard resin (produced as in Example 1) | 15 | 12 | 11 | 8 | 20 |
| Terphenyl wax | 2.5 | 3 | 2 | 1.5 | 1 |
| Carnauba wax No. 3 | 1 | 0.5 | 1.5 | 2.0 | 2.5 |
| Titanium dioxide | 12.5 | 5 | 8 | 10 | 12 |
| Barium sulfate | 9 | 15 | 12 | 11 | 16 |
| Calcium carbonate | 2.7 | 4 | 2 | 3 | 1 |
| Diatomaceous earth | 1.8 | 1.5 | 2 | 2 | 1 |
| Glass beads | 38.5 | 37.0 | 42.5 | 39.5 | 29.5 |
| Dioctyl sebacate | | 7 | | | |
| Dioctyl adipate | | | 6 | | |
| Tricresyl phosphate | 5 | | | | |
| Acetyl tributyl citrate | | | | | |
| Polyethylene | | | | 5 | |
| Dihexyl phthalate | | | | 7 | |

| | F | G | H | I | J | K |
|---|---|---|---|---|---|---|
| Ethyl cellulose, N-Type [1] | N–200, 10 | N–150, 10 | N–100, 17 | N–50, 22 | N–100, 10 | N–10, 5 |
| Hard resin (produced as in Example 1) | | | 5 | | 7 | |
| Terphenyl wax | 0.5 | 2.5 | 3 | .5 | 1 | 2.5 |
| Carnauba wax No. 3 | 3.0 | 1 | 1 | 3 | 2.5 | .5 |
| Titanium dioxide | 14 | 12.5 | 12.1 | 8 | 5 | 10 |
| Barium sulfate | 8 | 9 | 9 | 15 | 20 | 11 |
| Calcium carbonate | 5 | 2.7 | 3 | 1 | 2 | 3 |
| Diatomaceous earth | 2 | 1.8 | 2 | 2 | 1 | 3 |
| Glass beads | 16.5 | 36.5 | 37.9 | 35.5 | 24.5 | 43.0 |
| Dioctyl sebacate | | | | | | |
| Dioctyl adipate | | 10 | | | | |
| Tricresyl phosphate | | | | | 7 | |
| Acetyl tributyl citrate | | | | 8 | | |
| Polyethylene | 17 | 14 | 5 | 5 | 10 | 22 |
| Dihexyl phthalate | 7 | | 5 | | | 0 |

[1] The N-type refers to the viscosity of the ethyl cellulose. Thus, N–50 has a viscosity of 50 centipoises in a 5% solution of 80:20 toluene:ethanol.

What is claimed is:
1. A preformed traffic marker composition in solid intimate unitary admixture form consisting essentially of: (1) a binder, (2) a coloring agent, (3) glass beads and (4) fillers and extenders, with said binder comprising (a) about 5 to 80% by weight of an alkyl cellulose, (b) in addition to the total amount of any alkyl celluloses present, about 5 to 90% by weight of a thermoplastic rosinless nonphenolic based resin of the group consisting of polyethylene, polypropylene, polyesters, cyclized rubber and natural resin dammar, which is hard at climatic temperatures, (c) from 0 to 4% by weight of a wax-like material and (d) from 0 to 20% by weight of a plasticizer compatible with the alkyl cellulose and the resin.

2. A composition according to claim 1 in which the alkyl cellulose is ethyl cellulose.

3. A composition according to claim 1 in which the binder comprises from 20 to 95% of the entire composition.

4. A preformed traffic marker composition in solid intimate unitary admixture form consisting essentially of: (1) 20 to 95% by weight of a binder, (2) at least 5% by weight of a coloring agent, (3) from 0 to 50% by weight of glass beads and (4) from 0 to 75% by weight of fillers and extenders, with said binder comprising (a) about 5 to 80% by weight of an alkyl cellulose, (b) in addition to the total amount of any alkyl celluloses present, about 5 to 90% by weight of a thermoplastic rosinless nonphenolic based resin of the group consisting of polyethylene, polypropylene, polyesters, cyclized rubber and natural resin dammar, which is hard at climatic temperatures, (c) from 0 to 4% by weight of a wax-like material and (d) from 0 to 20% by weight of a plasticizer compatible with the alkyl cellulose and the resin.

5. A composition according to claim 4 in which the binder contains about 15 to 50 percent by weight of an alkyl cellulose.

6. A traffic marker according to claim 1 in the form of a thin sheet having a pressure sensitive adhesive applied to one surface and a sheet of release material applied over and in contact with the adhesive bearing surface.

7. A preformed traffic marker composition, in solid intimate unitary admixture form consisting essentially of: (a) about 5 to 80% by weight of ethyl cellulose (46.8 to 49% ethoxyl; viscosity 10 to 200 centipoises), (b) in addition to the ethyl cellulose present, about 5 to 90% by weight of a thermoplastic nonphenolic based, rosinless, noncoumarone based resin of the group consisting of polyethylene, polypropylene, polyesters, cyclized rubber and natural resin dammar, which is hard at climatic temperatures, (c) from 0 up to a small percent by weight of a wax-like material, (d) from 0 to 20% by weight of a plasticizer compatible with the ethyl cellulose and the resin and (e) a coloring agent.

8. A preformed traffic marker composition in solid intimate unitary admixture form consisting essentially of: (a) about 5 to 80% by weight of an alkyl cellulose, (b) in addition to the total amount of any alkyl celluloses present, about 5 to 90% by weight of a thermoplastic rosinless non-phenolic based resin of the group consisting of polyethylene, polypropylene, polyesters, cyclized rubber and natural resin dammar, which is hard at climatic temperatures, (c) from 0 up to a small percent by weight of a wax-like material, (d) from 0 to 20% by weight of a plasticizer compatible with the ethyl cellulose and the resin and (e) a coloring agent.

9. A traffic marker composition comprising in solid intimate unitary admixture form: (1) 20 to 95% by weight of a binder which is hard at climatic temperatures, (2) at least 5% by weight of a coloring agent, (3) from 0 to 50% by weight of glass beads and (4) from 0 to 75% by weight of fillers and extenders, with said binder comprising (a) about 5 to 80% by weight of ethyl cellulose, (b) about 5 to 90% by weight of a thermoplastic resin copolymer of styrene, alpha-methyl styrene and at least one ester of an unsaturated acid with the combined amounts of styrene and alpha-methyl styrene being at least 50% by weight of the copolymer and with the alpha-methyl styrene being about 5 to 40% by weight of the combined weight of styrene and alpha-methyl styrene, (c) from 0 to 4% by weight of a wax-like material and (d) from 0 to 20% by weight of a plasticizer compatible with the ethyl cellulose and resin.

10. A composition according to claim 9 containing a small amount of an organic phosphite.

11. A composition according to claim 9 in which the ester of the unsaturated acid is of a lower dibasic acid and the ester contains up to 14 carbons.

12. A composition according to claim 9 in which the ester is of a lower monobasic monoethylenically unsaturated acid.

13. A composition according to claim 9 in which the ester is of a lower dibasic monoethylenically unsaturated acid.

References Cited
UNITED STATES PATENTS

| | | | |
|---|---|---|---|
| 2,574,971 | 11/1951 | Heltzer | 106—241 |
| 2,997,403 | 7/1961 | Searight | 106—193 |

WILLIAM H. SHORT, *Primary Examiner.*

J. NORRIS, *Assistant Examiner.*